(12) United States Patent
King

(10) Patent No.: US 12,122,186 B2
(45) Date of Patent: Oct. 22, 2024

(54) HUB ASSEMBLY FOR HUMAN-POWERED VEHICLE

(71) Applicant: Shimano Inc., Osaka (JP)

(72) Inventor: Kong Wung King, Johor (MY)

(73) Assignee: Shimano Inc., Osaka (JP)

(*) Notice: Subject to any disclaimer, the term of this patent is extended or adjusted under 35 U.S.C. 154(b) by 440 days.

(21) Appl. No.: 17/528,649

(22) Filed: Nov. 17, 2021

(65) Prior Publication Data

US 2023/0150304 A1    May 18, 2023

(51) Int. Cl.
| | |
|---|---|
| *B60B 27/04* | (2006.01) |
| *B60B 27/02* | (2006.01) |
| *F16D 1/10* | (2006.01) |
| *F16D 41/30* | (2006.01) |

(52) U.S. Cl.
CPC .......... *B60B 27/047* (2013.01); *B60B 27/023* (2013.01); *F16D 1/10* (2013.01); *F16D 41/30* (2013.01); *F16D 2001/103* (2013.01)

(58) Field of Classification Search
CPC ..... B60B 27/047; B60B 27/023; F16D 41/30; F16D 2001/103; F16D 1/10; B62M 9/10
See application file for complete search history.

(56) References Cited

U.S. PATENT DOCUMENTS

| | | | | |
|---|---|---|---|---|
| 5,513,733 A | * | 5/1996 | Fu ........................... | F16D 41/28 |
| | | | | 192/64 |
| 5,738,197 A | * | 4/1998 | Kroger .................... | F16D 41/30 |
| | | | | 192/64 |
| 7,042,123 B2 | | 5/2006 | Kitamura et al. | |
| 2005/0139444 A1 | * | 6/2005 | Kanehisa .............. | B60B 27/047 |
| | | | | 192/64 |
| 2006/0191764 A1 | | 8/2006 | Kanehisa et al. | |
| 2011/0094846 A1 | * | 4/2011 | Wu ........................ | B60B 27/023 |
| | | | | 192/64 |
| 2014/0312680 A1 | * | 10/2014 | Chen ....................... | B60B 27/04 |
| | | | | 301/110.5 |
| 2018/0170099 A1 | | 6/2018 | Yamazaki | |

FOREIGN PATENT DOCUMENTS

FR        2506412 A1  *  11/1982

* cited by examiner

*Primary Examiner* — Kip T Kotter
(74) *Attorney, Agent, or Firm* — Global IP Counselors, LLP

(57) ABSTRACT

A hub assembly is provided for a human-powered vehicle. The hub assembly includes a hub axle, a hub body, a pawl support body, at least one pawl, a sprocket support body, at least one sprocket support bearing, a ratchet body and a plurality of ratchet teeth. The hub body is rotatably mounted on the hub axle. The pawl support body is connected to the hub body. The pawl is movable between a driving position and a non-driving position. The at sprocket support bearing rotatably supports the sprocket support body on the hub axle. The ratchet body is connected to the sprocket support body. The ratchet teeth engage the pawl to transmit a driving force from the sprocket support body to the hub body while rotating in a driving rotational direction. The sprocket support bearing is disposed opposite to the hub body with respect to the ratchet teeth.

19 Claims, 9 Drawing Sheets

HUB ASSEMBLY FOR HUMAN-POWERED VEHICLE

BACKGROUND

Technical Field

The present disclosure generally relates to a hub assembly for a human-powered vehicle. More specifically, the present disclosure generally relates to a hub assembly that has a sprocket support body of supporting at least one sprocket.

Background Information

Generally, a wheel for a human-powered vehicle has a hub assembly, a plurality of spokes and an annular rim. Basically, the hub assembly has a hub axle and a hub body. The hub axle is non-rotatably mounted to a frame of the human-powered vehicle. The hub body that is coaxially coupled to the hub axle so that the hub body is disposed radially outwardly with respect to the hub axle. The bearings are configured and arranged to support the hub body so that the hub body can freely rotate around the hub axle. In some human-powered vehicle, such as bicycles, a wheel is provided with a sprocket support body that is rotatably disposed to the hub axle. The sprocket support body is usually coupled to hub body by a one-way clutch such that torque is transferred from the sprocket support body to the hub body in one direction. This type of sprocket support body is sometimes called a freewheel.

SUMMARY

Generally, the present disclosure is directed to various features of a hub assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub assembly is provided for a human-powered vehicle. The hub assembly basically comprises a hub axle, a hub body, a pawl support body, at least one pawl, a sprocket support body, at least one sprocket support bearing, a ratchet body and a plurality of ratchet teeth. The hub body is rotatably mounted on the hub axle to rotate around a rotational center axis of the hub assembly. The pawl support body is connected to the hub body. The at least one pawl is movably provided to the pawl support body to move between a driving position and a non-driving position. The sprocket support body is rotatably disposed to the hub axle to rotate around the rotational center axis. The at least one sprocket support bearing rotatably supports the sprocket support body on the hub axle. The ratchet body is connected to the sprocket support body. The ratchet teeth are provided to the ratchet body for engaging the at least one pawl to transmit a driving force from the sprocket support body to the hub body while rotating in a driving rotational direction around the rotational center axis. Each of the at least one sprocket support bearing is disposed opposite to the hub body with respect to the plurality of ratchet teeth in an axial direction with respect to the rotational center axis.

With the hub assembly according to the first aspect, the component force exerted on the sprocket support body from the at least one pawl is spread out and the compressive force on the at least one sprocket support bearing is reduced.

In accordance with a second aspect of the present disclosure, the hub assembly according to the first aspect is configured so that the plurality of ratchet teeth is provided on an outer peripheral side of the at least one pawl.

With the hub assembly according to the second aspect, the component force exerted on the sprocket support body is directed outwardly with respect to the rotational center axis.

In accordance with a third aspect of the present disclosure, the hub assembly according to the first aspect or the second aspect is configured so that the pawl support body is integrally formed with the hub body as a unitary, one-piece member.

With the hub assembly according to the third aspect, the hub body and the pawl support body can be simplified.

In accordance with a fourth aspect of the present disclosure, the hub assembly according to the first aspect or the second aspect is configured so that the pawl support body is a separate member from the hub body.

With the hub assembly according to the fourth aspect, the hub body and the pawl support body can be easily manufactured at a relatively low cost.

In accordance with a fifth aspect of the present disclosure, the hub assembly according to any one of the first aspect to the fourth aspect is configured so that the ratchet body is integrally formed with the sprocket support body as a unitary, one-piece member.

With the hub assembly according to the fifth aspect, the structure of the sprocket support body and the ratchet body can be simplified.

In accordance with a sixth aspect of the present disclosure, the hub assembly according to any one of the first aspect to the fourth aspect is configured so that the ratchet body is a separate member from the sprocket support body.

With the hub assembly according to the sixth aspect, it is possible to manufacture the ratchet body and the sprocket support body from different materials that are more suited for each of their functions.

In accordance with a seventh aspect of the present disclosure, the hub assembly according to any one of the first aspect to the sixth aspect is configured so that the sprocket support body has a splined region which includes a plurality of splines, and the ratchet teeth are disposed outside the splined region in the axial direction.

With the hub assembly according to the seventh aspect, one or more sprockets can be mounted to the splined region of the sprocket support body and the ratchet teeth are not directly subjected to a force from the one or more sprockets.

In accordance with an eighth aspect of the present disclosure, the hub assembly according to any one of the first aspect to the seventh aspect is configured so that at least one of the at least one pawl and the plurality of ratchet teeth are overlapped with the hub body as viewed in a radial direction with respect to the rotational center axis.

With the hub assembly according to the eighth aspect, at least one of the at least one pawl and the plurality of ratchet teeth can be protected by the hub body.

In accordance with a ninth aspect of the present disclosure, the hub assembly according to any one of the first aspect to the eighth aspect is configured so that the plurality of ratchet teeth are disposed at an end portion of the sprocket support body on a hub body side.

With the hub assembly according to the ninth aspect, the rotation from the sprocket support body can be reliably transmitted to the hub body.

In accordance with a tenth aspect of the present disclosure, the hub assembly according to any one of the first aspect to the ninth aspect further comprises at least one hub bearing rotatably supporting the hub body on the hub axle. Each of the at least one hub bearing is disposed opposite the at least one sprocket support bearing with respect to the ratchet teeth in the axial direction.

With the hub assembly according to the tenth aspect, the hub body can be rotatably supported on the hub axle for smooth rotation of the hub body with respect to the hub axle. The hub assembly has a simple structure and is suitable for manufacturing.

In accordance with an eleventh aspect of the present disclosure, the hub assembly according to the tenth aspect is configured so that the at least one pawl is disposed axially between each of the at least one hub bearing and each of the at least one sprocket support bearing in the axial direction.

With the hub assembly according to the eleventh aspect, the sprocket support body can be easily separated from the hub body such that the at least one pawl can be easily serviced, replaced or repaired.

In accordance with a twelfth aspect of the present disclosure, the hub assembly according to any one of the first aspect to the eleventh aspect is configured so that the pawl support body is non-rotatably coupled to the hub body and supporting the at least one pawl.

With the hub assembly according to the twelfth aspect, the complicated structure of the pawl support body and the at least one pawl are provided to the hub body and the sprocket support body can be simplified. Thus, the replacement work can be easily performed, and the price of the replacement parts can be reduced.

In accordance with a thirteenth aspect of the present disclosure, the hub assembly according to the twelfth aspect is configured so that the pawl support body is non-rotatably coupled to the hub body with spline engagement.

With the hub assembly according to the thirteenth aspect, the pawl support body can be easily installed to the hub body.

In accordance with a fourteenth aspect of the present disclosure, the hub assembly according to any one of the first aspect to the thirteenth aspect is configured so that the at least one pawl includes a plurality of pawls.

With the hub assembly according to the fourteenth aspect, the component force transmitted to the sprocket support body can be more balanced.

In accordance with a fifteenth aspect of the present disclosure, the hub assembly according to any one of the first aspect to the fourteenth aspect is configured so that the plurality of ratchet teeth are provided on an inner surface of the ratchet body.

With the hub assembly according to the fifteenth aspect, the structure of the ratchet body can be simplified.

In accordance with a sixteenth aspect of the present disclosure, the hub assembly according to any one of the first aspect to the fifteenth aspect is configured so that the at least one pawl is located inside the hub body.

With the hub assembly according to the sixteenth aspect, rotation of the sprocket support body can be reliably transmitted to the hub body by the at least one pawl.

In accordance with a seventeenth aspect of the present disclosure, the hub assembly according to any one of the first aspect to the sixteenth aspect is configured so that the sprocket support body and the plurality of ratchet teeth are a single, one-piece member.

With the hub assembly according to the seventeenth aspect, the structure of the sprocket support body and the plurality of ratchet teeth can be simplified.

In accordance with an eighteenth aspect of the present disclosure, the hub assembly according to any one of the first aspect to the seventeenth aspect is configured so that the at least one sprocket support bearing includes a first sprocket support bearing and a second sprocket support bearing that are axially spaced apart along the hub axle.

With the hub assembly according to the eighteenth aspect, smooth rotation of the sprocket support body on the hub axle can be reliably achieved.

In accordance with a nineteenth aspect of the present disclosure, the hub assembly according to the eighteenth aspect further comprises an end cap threadedly coupled to a first end of the hub axle and contacting the first sprocket support bearing to retain the sprocket support body to the hub axle.

With the hub assembly according to the nineteenth aspect, it is possible to easily remove and replace the sprocket support body to the hub axle.

In accordance with a twentieth aspect of the present disclosure, the hub assembly according to the eighteenth aspect or the nineteenth aspect is configured so that the sprocket support body includes a first bearing abutment contacting a first outer race of the first sprocket support bearing and a second bearing abutment contacting a second outer race of the second sprocket support bearing. The first bearing abutment faces in an opposite direction from the second bearing abutment with respect to the rotational center axis.

With the hub assembly according to the twentieth aspect, the first sprocket support bearing and the second sprocket support bearing can be easily located at the appropriate axial locations with respect to the rotational center axis.

Also, other objects, features, aspects and advantages of the disclosed hub assembly will become apparent to those skilled in the art from the following detailed description, which, taken in conjunction with the annexed drawings, discloses preferred embodiments of the hub assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
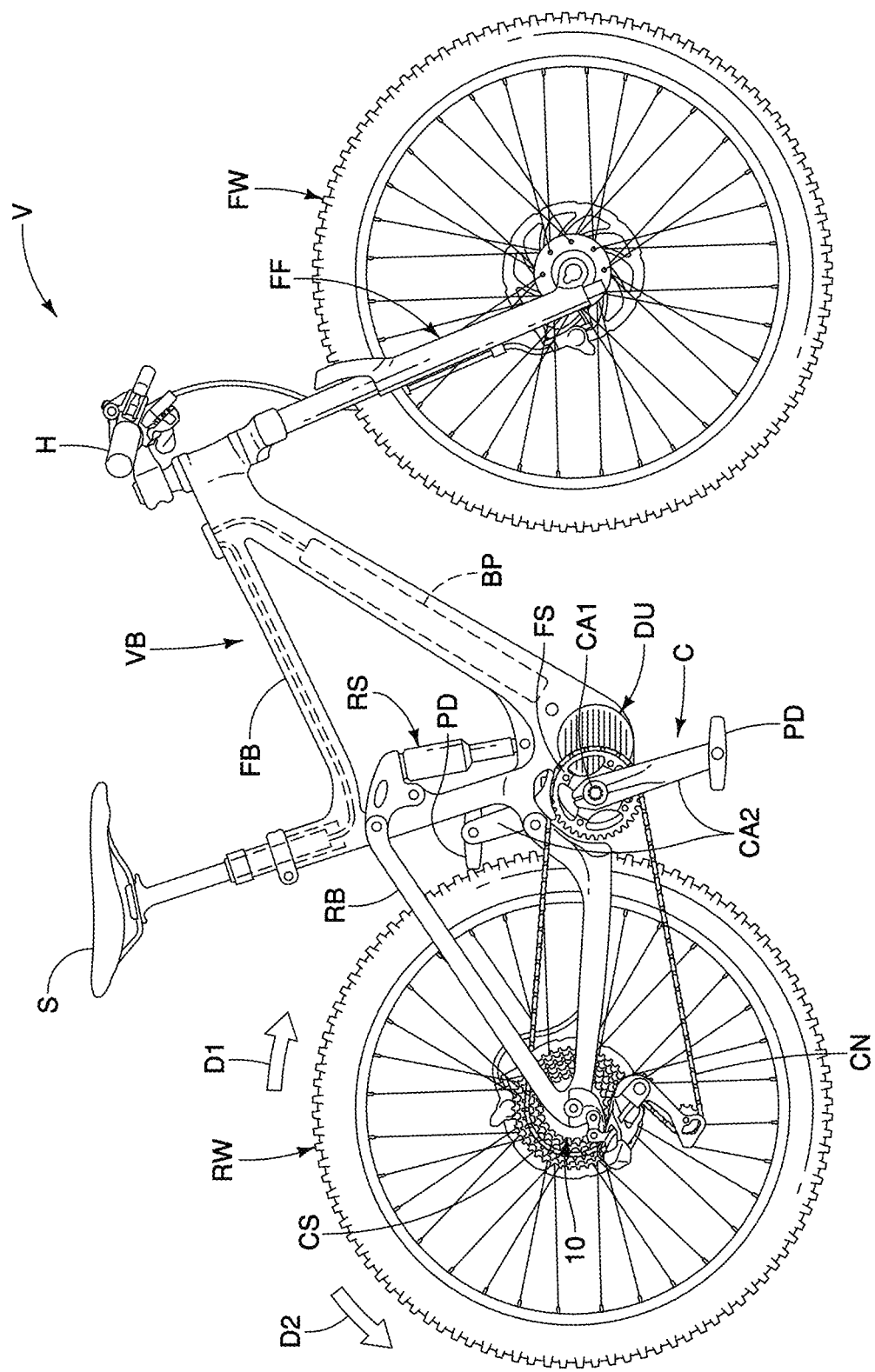
FIG. 1 is a side elevational view of a human-powered vehicle (e.g., a bicycle) equipped with a rear wheel having a hub assembly in accordance with a first embodiment.

Referring initially to FIG. 1, a hub assembly 10 is provided for a human-powered vehicle V. In other words, the human-powered vehicle V (i.e., a bicycle) is illustrated that is equipped with the hub assembly 10 in accordance with the illustrated embodiments. Here, in the illustrated embodiment, the hub assembly 10 is a bicycle hub. More specifically, the hub assembly 10 is a bicycle rear hub. Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle.

As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A bicycle seat or saddle S is mounted to a seat tube of the front frame body FB in a conventional manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke stroke length of the rear shock absorber RS and the front fork FF can be adjusted.

The bicycle V further includes an electric drive unit DU that has an electric motor that provides a drive assist force to a front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. Here, for example, the drivetrain is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CAL A pedal PD is rotatably coupled to the distal end of each of the crank arms CA2. The drivetrain can be selected from any type, and can be a belt-drive type or a shaft-drive type.

The structure of the hub assembly 10 will now be described with particular reference to FIGS. 2 to 6. The hub assembly 10 basically comprises a hub axle 12 and a hub body 14. The hub axle 12 is configured to be non-rotatably attached to the vehicle body VB. In this embodiment, the hub axle 12 is configured to be non-rotatably attached to the rear frame body RB. The hub body 14 is rotatably mounted on the hub axle 12 to rotate around a rotational center axis A1 of the hub assembly 10. The hub axle 12 has a center axis coaxial with the rotational center axis A1. The hub body 14 is rotatably disposed around the rotational center axis A1. In other words, the hub body 14 is rotatably mounted around the hub axle 12.

Figure 5:
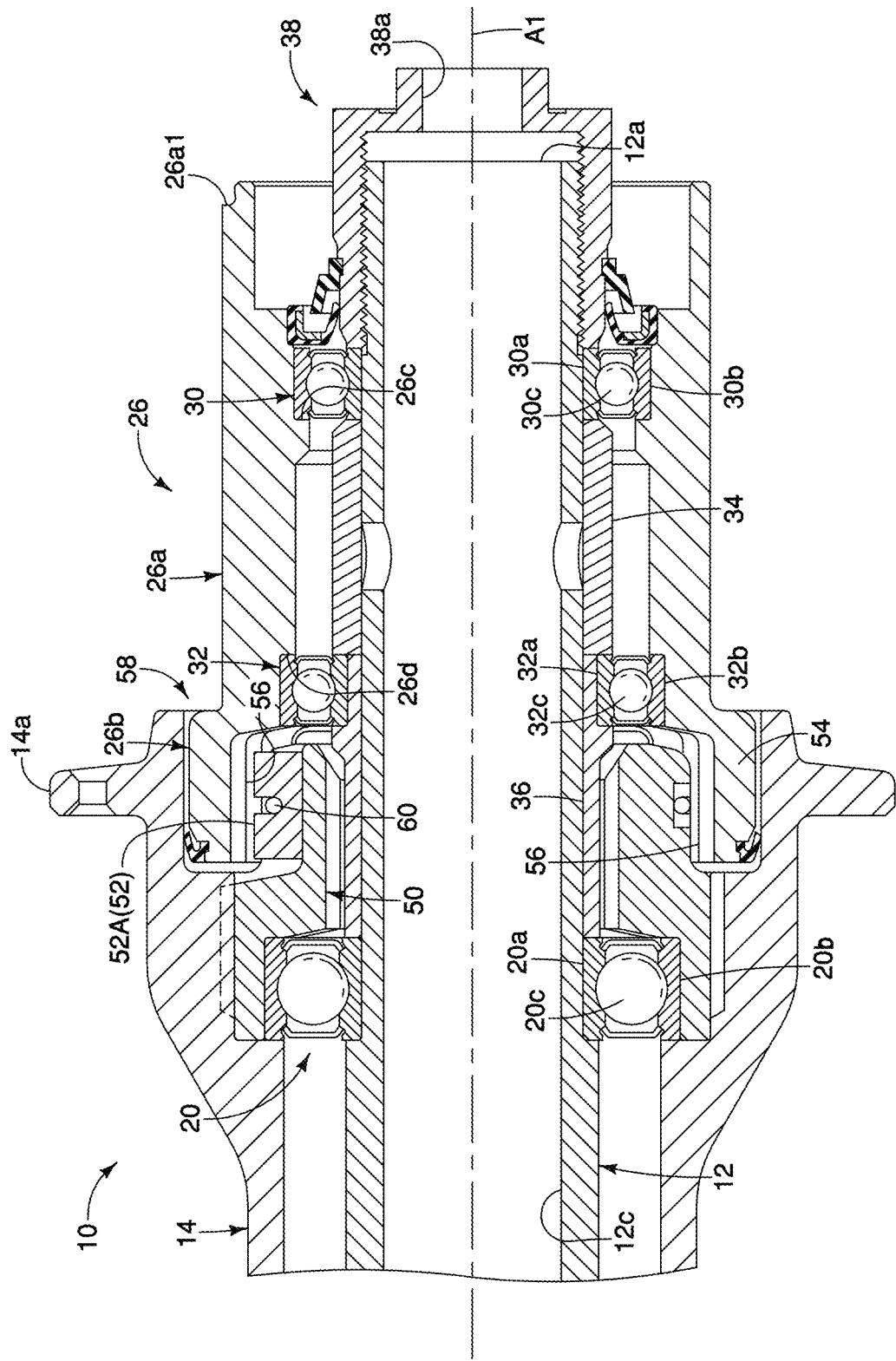
FIG. 5 is an enlarged cross sectional view of a portion of the hub assembly illustrated in FIG. 4.
Figure 6:
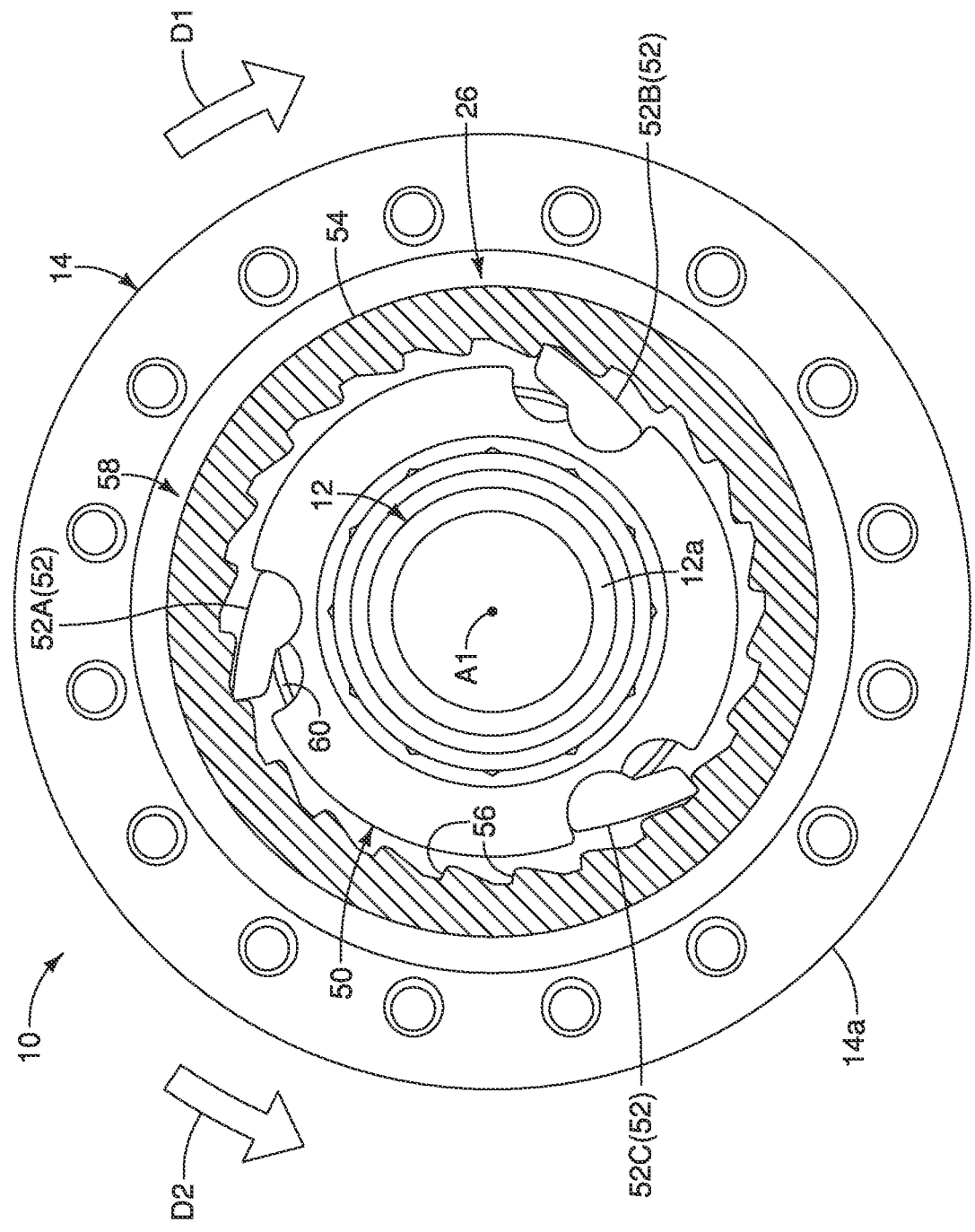
FIG. 6 is a transverse cross-sectional view of the hub assembly illustrated in FIGS. 2 to 4 as seen along section line 6-6 in FIG. 2.
Figure 7:
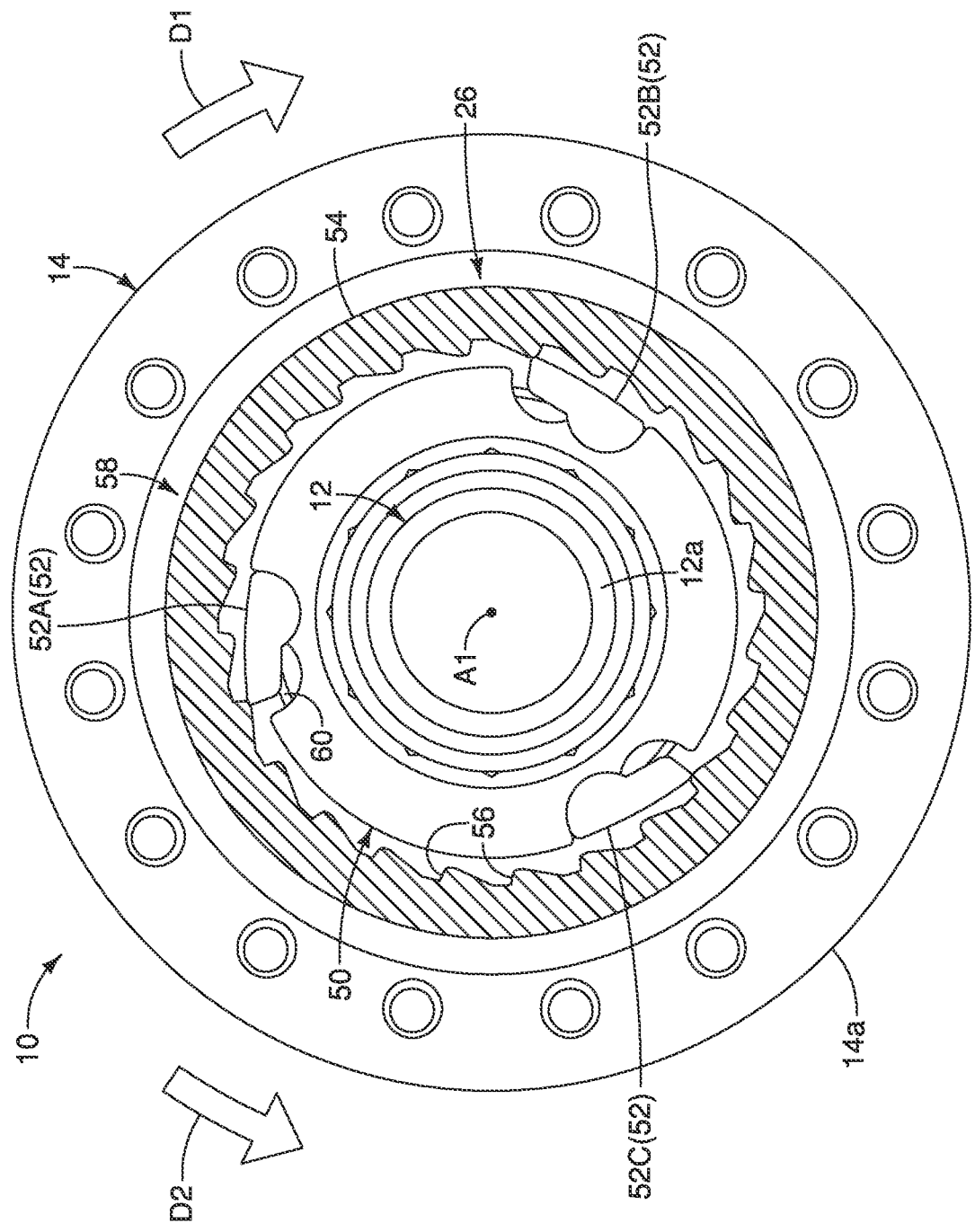
FIG. 7 is a transverse cross-sectional view, similar to FIG. 6, of the hub assembly, but where the sprocket support body has been rotated so that the pawls have moved from the driving position of FIG. 6 to a non-driving position.

As seen in FIGS. 5 to 7, the hub axle 12 is a rigid member made of a suitable material such as a metallic material. The hub axle 12 has a first end 12a and a second end 12b. Here, the hub axle 12 is a tubular member that is a one-piece member. Thus, the hub axle 12 has an axial bore 12c that extends between the first end 12a and the second end 12b. The hub axle 12 can be a one-piece member or made of several pieces.

Figure 3:
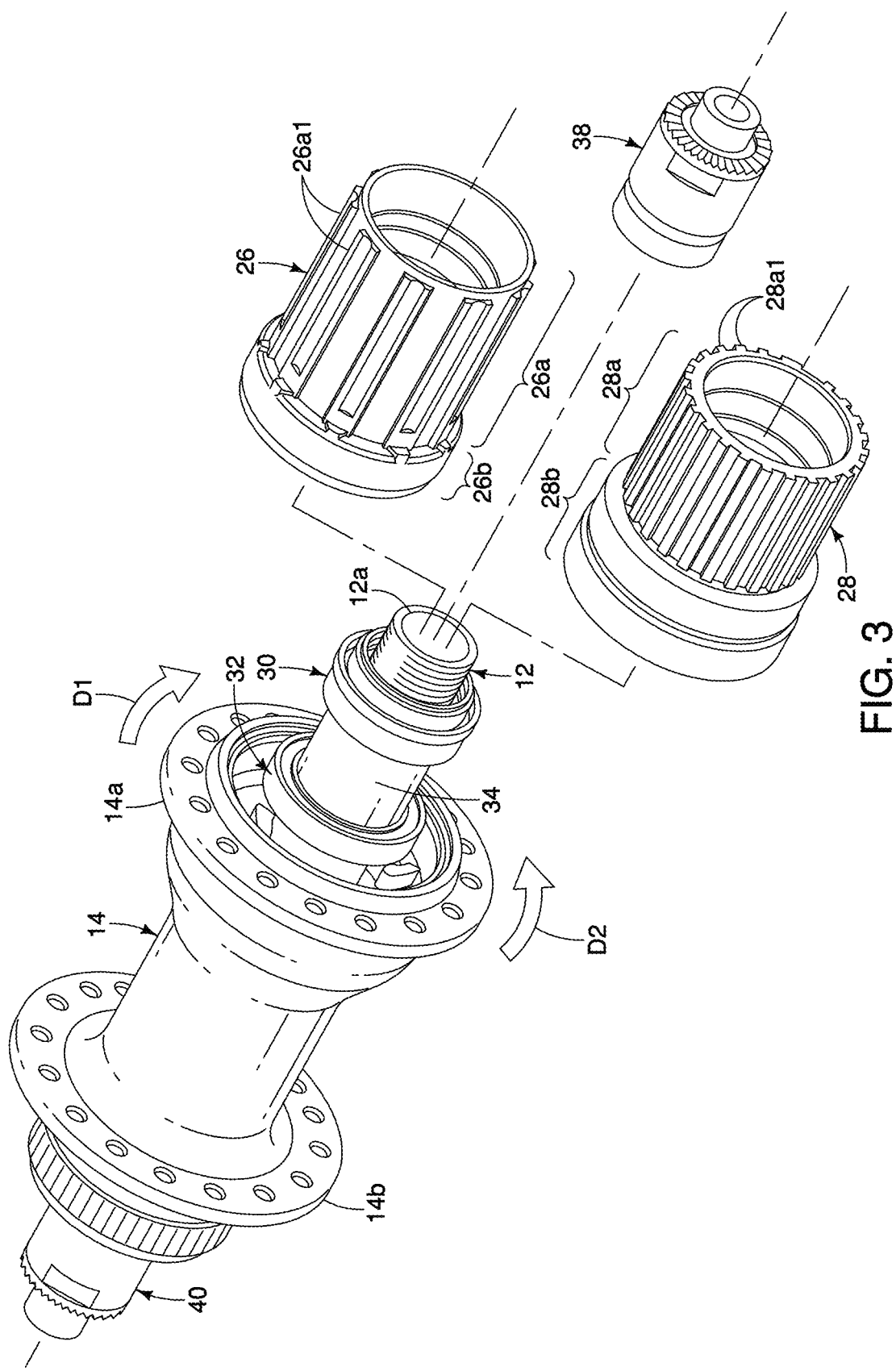
FIG. 3 is a partially exploded perspective view of the hub assembly illustrated in FIGS. 1 and 2 where two sprocket support body can be selectively installed onto the hub axle.

As indicated in FIGS. 1 and 3, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the rotational center axis A1 from a peripheral surface of the hub body 14. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

Figure 4:
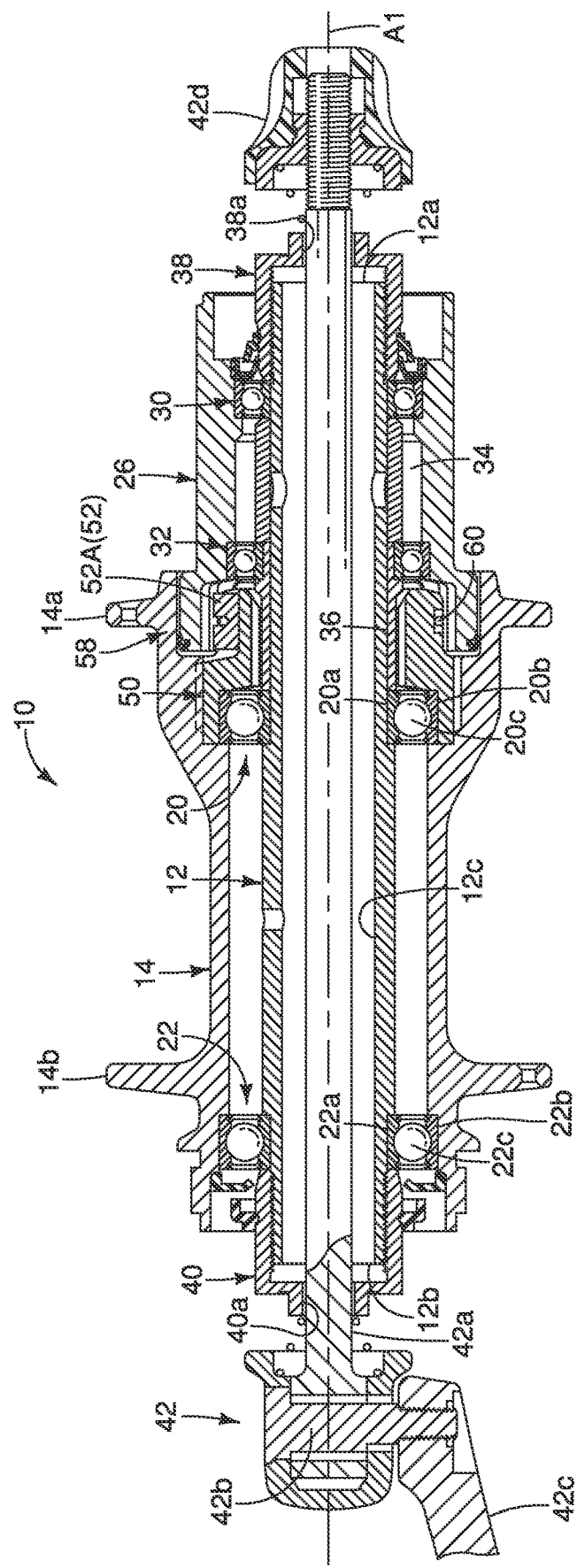
FIG. 4 is a longitudinal cross-sectional view of the hub assembly illustrated in FIGS. 2 to 4.

The hub assembly 10 further comprises at least one hub bearing rotatably supporting the hub body 14 on the hub axle 12. In the illustrated embodiment as seen in FIG. 4, the hub assembly 10 further comprises a first hub body bearing 20 and a second hub body bearing 22. The first hub body bearing 20 rotatably supports a first end of the hub body 14 with respect to the rotational center axis A1. The second hub body bearing 22 rotatably supports a second end of the hub body 14 with respect to the rotational center axis A1. The first hub body bearing 20 includes a first inner race 20a, a first outer race 20b and a plurality of first roller elements 20c. The first roller elements 20c are disposed between the first inner race 20a and the first outer race 20b. The second hub body bearing 22 includes a second inner race 22a, a second outer race 22b and a plurality of second roller elements 22c. The second roller elements 22c are disposed between the second inner race 22a and the second outer race 22b.

The first hub body bearing 20 and the second hub body bearing 22 are radial ball bearings. Radial ball bearings support force in the direction perpendicular to the axis. Further, a radial roller bearing can be adopted instead of the radial ball bearing for one or both of the first hub body bearing 20 and the second hub body bearing 22. Radial roller bearings include cylindrical roller bearings and needle roller bearings. Alternatively, an angular contact ball bearing can be adopted instead of a radial ball bearing for one or both of the first hub body bearing 20 and the second hub body bearing 22. Angular contact ball bearings have inner and outer ring raceways that are displaced relative to each other in the direction of the bearing axis. In other words, angular contact bearings are designed to accommodate combined loads, i.e., simultaneously acting radial and axial loads. Further, an angular contact roller bearing (i.e., tapered roller bearing) can be adopted instead of a radial ball bearing one or both of the first hub body bearing 20 and the second hub body bearing 22. Angular contact roller bearings include cylindrical roller bearings and needle roller bearings.

Figure 2:
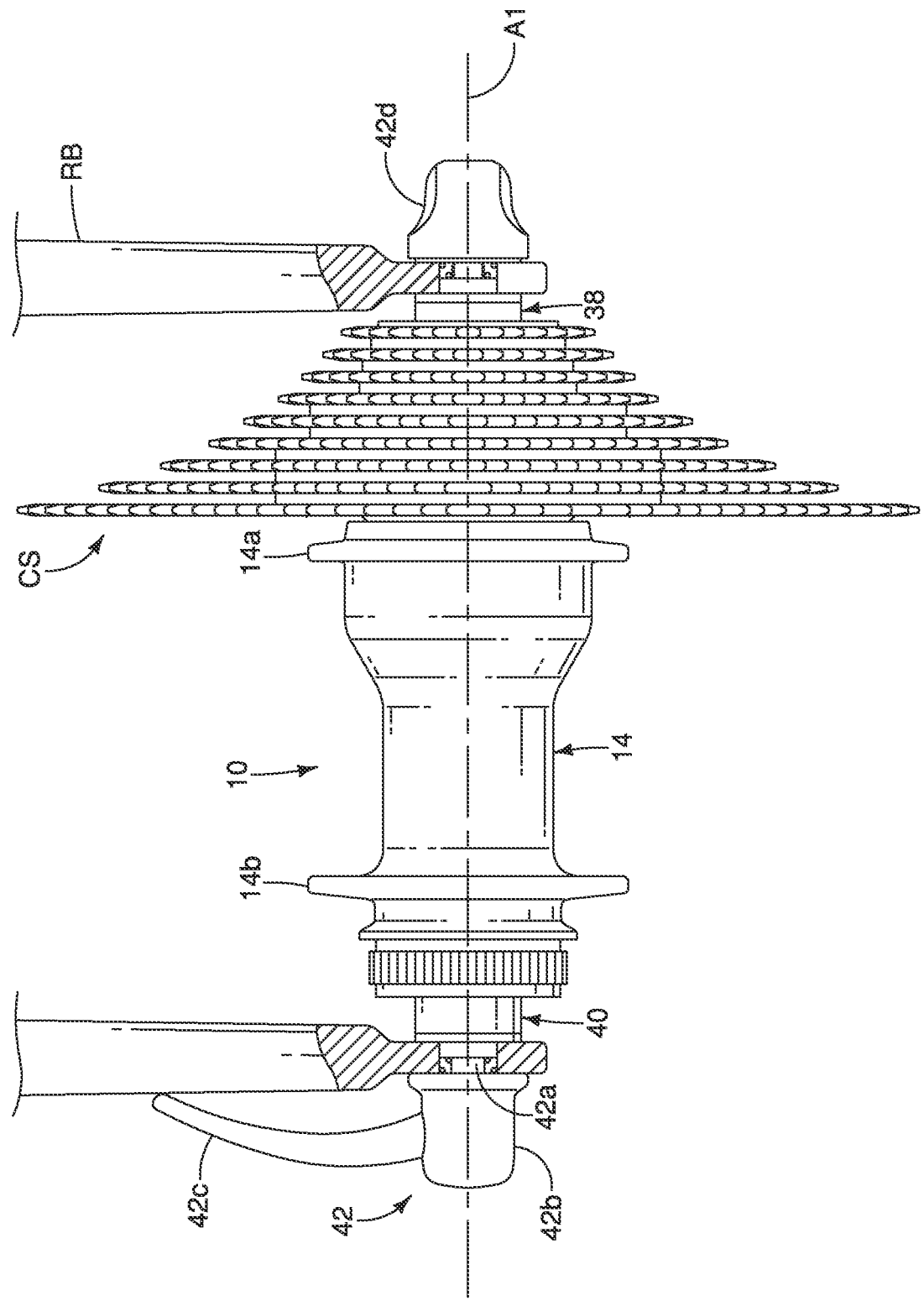
FIG. 2 is an elevational view of the hub assembly attached to the vehicle body of the human-powered vehicle illustrated in FIG. 1.

Here, the hub assembly 10 further comprises a sprocket support body 26. In the illustrated embodiment, the sprocket support body 26 supports the rear sprockets CS as seen in FIG. 2. The sprocket support body 26 is rotatably disposed to the hub axle 12 to rotate around the rotational center axis A1. The sprocket support body 26 transmits a driving force to the hub body 14 while rotating in a driving rotational direction D1 around the rotational center axis A1. As explained below, the sprocket support body 26 does not transmit a driving force to the hub body 14 while rotating in a non-driving rotational direction D2 around the rotational center axis A1. The non-driving rotational direction D2 is opposite to the driving rotational direction D1 with respect to the rotational center axis A1. The rotational center axis of the sprocket support body 26 is disposed concentrically with the rotational center axis A1 of the hub assembly 10.

While the sprocket support body 26 is configured to non-rotatably support the rear sprockets CS, the sprocket support body 26 is not limited to the illustrated embodiment. Alternatively, one or more of the rear sprockets CS can be integrally formed with the sprocket support body 26. In any case, the sprocket support body 26 and the rear sprockets CS are coupled together to rotate together in both the driving rotational direction D1 and the non-driving rotational direction D2.

As seen in FIGS. 3 and 4, the sprocket support body 26 has a splined region 26a which includes a plurality of splines 26a1. The splines 26a1 are external splines that are configured to engage the rear sprockets CS. In this way, the rear sprockets CS are non-rotatably coupled to the sprocket support body 26. The sprocket support body 26 also has a non-splined region 26b that is configured to be at least partially disposed inside the hub body 14. Thus, the hub body 14 and the sprocket support body 26 partially overlap.

Referring to FIG. 3, the hub assembly 10 is configured such that the sprocket support body 26 can be easily replaced with a sprocket support body 28, as explained below. The sprocket support body 28 is identical to the sprocket support body 26 except for the exterior configuration. In particular, the sprocket support body 28 has a splined region 28a which includes a plurality of splines 28a1. In the sprocket support body 28, the splines 28a1 are narrower than the splines 26a1. Also, the total number of the splines 28a1 of the sprocket support body 28 is greater than the total number of the splines 26a1 of the sprocket support body 26. Finally, the sprocket support body 28 also has a non-splined region 28b that is configured to be at least partially disposed inside the hub body 14. In the sprocket support body 28, the non-splined region 28b has an axial length longer than an axial length of the non-splined region 26b of the sprocket support body 26.

The hub assembly 10 further comprises at least one sprocket support bearing. The at least one sprocket support bearing rotatably supports the sprocket support body 26 on the hub axle 12. Here, the at least one sprocket support bearing includes a first sprocket support bearing 30 and a second sprocket support bearing 32 that are axially spaced apart along the hub axle 12. The first sprocket support bearing 30 rotatably supports a first end of the sprocket support body 26. The second sprocket support bearing 32 rotatably supports a second end of the sprocket support body 26. Each of the at least one sprocket support bearing is disposed opposite to the hub body 14 with respect to the plurality of ratchet teeth 56 in an axial direction with respect to the rotational center axis A1.

The first sprocket support bearing 30 and the second sprocket support bearing 32 have outer diameters that are smaller than the first hub body bearing 20 and the second hub body bearing 22. Here, the inner diameter of the first sprocket support bearing 30 is smaller than the inner diameter of the second sprocket support bearing 32. The first sprocket support bearing 30 and the second sprocket support bearing 32 are mounted on the hub axle 12 from the first end 12a of the hub axle 12.

The first sprocket support bearing 30 includes a first inner race 30a, a first outer race 30b and a plurality of first roller elements 30c. The first roller elements 30c are disposed between the first inner race 30a and the first outer race 30b. The second sprocket support bearing 32 includes a second inner race 32a, a second outer race 32b and a plurality of second roller elements 32c. The second roller elements 32c are disposed between the second inner race 32a and the second outer race 32b. Here, the first sprocket support bearing 30 and the second sprocket support bearing 32 are radial ball bearings. As mentioned above, radial ball bearings support force in the direction perpendicular to the axis. Further, one of an angular contact ball bearing, a radial roller bearing and an angular contact roller bearing can be adopted instead of a radial ball bearing for one or both of the first sprocket support bearing 30 and the second sprocket support bearing 32.

Here, the sprocket support body 26 includes a first bearing abutment 26c contacting the first outer race 30b of the first sprocket support bearing 30 and a second bearing abutment 26d contacting a second outer race 32b of the second sprocket support bearing 32. The first bearing abutment 26c faces in an opposite direction from the second bearing abutment 26d with respect to the rotational center axis A1.

A first tubular spacing element 34 is disposed on the hub axle 12 between the first sprocket support bearing 30 and the second sprocket support bearing 32. The first tubular spacing element 34 axially spaces the first sprocket support bearing 30 and the second sprocket support bearing 32 on the hub axle 12. Also, a second tubular spacing element 36 is disposed on the hub axle 12 between the first tubular spacing element 34 and the first hub body bearing 20. The second sprocket support bearing 32 is supported on the second tubular spacing element 36, and is axially sandwiched between an abutment of the second tubular spacing element 36 and an end of the first tubular spacing element 34. The second tubular spacing element 36 abuts the first hub body bearing 20. In this way, the second tubular spacing element 36 axially spaces the second sprocket support bearing 32 and the first hub body bearing 20.

In the first embodiment, the hub assembly 10 further comprises an end cap 38 threadedly coupled to the first end 12a of the hub axle 12 and contacting the first sprocket support bearing 30 to retain the sprocket support body 26 to the hub axle 12. The hub axle 12 also an end cap 40 that is threadedly coupled to the second end 12b of the hub axle 12. The end cap 40 contacts the second hub body bearing 22. In this way, the end cap 38 and the end cap 40 retain the hub body 16 to the hub axle 12. Also, the first end cap 38 and the second end cap 40 are configured to be received in mounting openings of the rear frame body RB as seen in FIG. 2. Here, the first end cap 38 has a first opening 38a and the second end cap 40 has a second opening 40a.

Here, as seen in FIGS. 2 and 5, the hub assembly 10 further comprises a wheel holding mechanism 42 for securing the hub axle 12 of the hub assembly 10 to the rear frame body RB. The wheel holding mechanism 42 basically includes a shaft or skewer 42a, a cam body 42b, a cam lever 42c and an adjusting nut 42d. The cam lever 42c is attached to one end of the skewer 42a via the cam body 42b, while the adjusting nut 42d is threaded on the other end of the skewer 42a. The lever 42c is attached to the cam body 42b. The cam body 42b is coupled between the skewer 42a and the cam lever 42c to move the skewer 42a relative to the cam body 42b. Thus, the lever 42c is operated to move the skewer 42a in the axial direction of the rotational center axis A1 with respect to the cam body 42b to change the distance between the cam body 42b and the adjusting nut 42d. Preferably, a compression spring is provided at each end of the skewer 42a. Alternatively, the hub axle 12 can be non-rotatably attached to the rear frame body RB with other attachment structures as needed and/or desired.

The hub assembly 10 further comprises a pawl support body 50, at least one pawl 52, a ratchet body 54 and a plurality of ratchet teeth 56. Basically, the pawl support body 50, the at least one pawl 52, the ratchet body 54 and the ratchet teeth 56 form a one-way clutch 58 operatively disposed between the hub body 14 and the sprocket support body 26. In this way, the sprocket support body 26 is coupled to the hub body 14 to rotate together in the driving rotational direction D1 around the rotational center axis A1, and the sprocket support body 26 is coupled to the hub body 14 to rotate relative to the hub body 14 in the non-driving rotational direction D2 around the rotational center axis A1. Also, with the one-way clutch 58, the hub body 14 can rotate relative to the sprocket support body 26 in the case where the sprocket support body 26 is stopped or rotating slower than hub body 14. In this way, the sprocket support body 26 and the one-way clutch 58 form a freewheel that is commonly used in bicycles. Since the basic operation of the freewheel is relatively conventional, the operation of the freewheel will not be discussed or illustrated in further detail.

Basically, the pawl support body 50 is non-rotatably coupled to the hub body 14 and supporting the at least one pawl 52. Thus, the hub body 14 and the pawl support body 50 are configured to rotate together around the rotational center axis A1. Here, as seen in FIG. 5, the pawl support body 50 is non-rotatably coupled to the hub body 14 with spline engagement. In the first embodiment, the pawl support body 50 is connected to the hub body 14. In particular, the pawl support body 50 has a plurality of outer splines that engage a plurality of inner splines of the hub body 14. The outer splines of the pawl support body 50 and the inner splines of the hub body 14 extend axially, and are parallel to the rotational center axis A1. In this way, the pawl support body 50 can be easily attached to the hub body 14 and detached from the hub body 14. Thus, in the first embodiment, the pawl support body 50 is a separate member from the hub body 14.

The at least one pawl 52 is movably provided to the pawl support body 50 to move between a driving position (FIG. 6) and a non-driving position (FIG. 7). In the driving position (FIG. 6), the at least one pawl 52 is engaged with one of the ratchet teeth 56 that is provided to the ratchet body 54. In this way, the driving position, rotation of the ratchet body 54 can be transmitted to the pawl support body 50 and the hub body 14. In the non-driving position (FIG. 7), the at least one pawl 52 becomes disengaged with the ratchet teeth 56. In this way, the non-driving position, the rotation of the ratchet body 54 is not transmitted to the pawl support body 50 and the hub body 14. In the first embodiment, the at least one pawl 52 is located inside the hub body 14. In particular, the at least one pawl 52 is disposed axially between each of the at least one hub bearing 20, 22 and each of the at least one sprocket support bearing 30, 32 in the axial direction. In other words, the first hub body bearing 20 and the second hub body bearing 22 are disposed on one axial side of the at least one pawl 52, and the first sprocket support bearing 30 and the second sprocket support bearing 32 are disposed on the other axial side of the at least one pawl 52. With this arrangement, the complicated structure of the pawl support body 50 and the at least one pawl 52 are provided to the hub body 14 and the sprocket support body 26 can be simplified. Thus, the sprocket support body 26 can be easily separated from the hub body 14 so that the replacement work can be easily performed.

Here, the at least one pawl 52 includes a plurality of pawls 52A, 52B and 52C. The pawls 52A, 52B and 52C are equally spaced apart in a circumferential direction on the pawl support body 50 around the rotational center axis A1. While a total of three pawls are shown, one or more pawls can be used as needed and/or desired. The one-way clutch 58 further includes a biasing element 60 that couples the pawls 52A, 52B and 52C to the pawl support body 50 such that each of the pawls 52A, 52B and 52C can move between the driving position (FIG. 6) and the non-driving position (FIG. 7). In particular, the biasing element 60 biases the pawls 52A, 52B and 52C into engagement with the ratchet teeth 56 of the ratchet body 54. The biasing element 60 squeezes the pawls 52A, 52B and 52C against the pawl support body 50 such that the pawls 52A, 52B and 52C pivot towards engagement with the ratchet teeth 56 of the ratchet body 54. In a case where the sprocket support body 26 is rotated in the non-driving rotational direction D2, the ratchet teeth 56 push pawls 52A, 52B and 52C and pivot pawls 52A, 52B and 52C to the non-driving (retracted) position against the pawl support body 50. Thus, the sprocket support body 26 is configured to rotate relative to the hub body 14 in the non-driving rotational direction D2 around the rotational center axis A1.

Also, at least one of the at least one pawl 52 and the plurality of ratchet teeth 56 are overlapped with the hub body 14 as viewed in a radial direction with respect to the rotational center axis A1. In the first embodiment, each of the pawls 52A, 52B and 52C and the ratchet teeth 56 both overlapped with the hub body 14 as viewed in a radial direction with respect to the rotational center axis A1.

As seen in FIGS. 5 to 8, the ratchet body 54 is connected to the sprocket support body 26. As a result, the ratchet body 54 is configured to rotate together with the sprocket support body 26 with respect to the rotational center axis A1. Here, the ratchet body 54 is integrally formed with the sprocket support body 26 as a unitary, one-piece member. Thus, the sprocket support body 26 and the ratchet body 54 is a single member that transmits the torque from the sprocket support body 26 to the pawl support body 50 via the pawls 52A, 52B and 52C. Typically, the sprocket support body 26 and the ratchet body 54 is made of a suitable hard and rigid material such as a metallic material or a fiber reinforced plastic material.

Basically, the ratchet teeth 56 are provided to the ratchet body 54 for engaging the at least one pawl 52 to transmit a driving force from the sprocket support body 26 to the hub body 14 while rotating in the driving rotational direction D1 around the rotational center axis A1. Also, here, in the first embodiment, the plurality of ratchet teeth 56 are provided on an inner surface of the ratchet body 54. Thus, the plurality of ratchet teeth 56 is provided on an outer peripheral side of the at least one pawl 52.

Moreover, the sprocket support body 26 and the plurality of ratchet teeth 56 are a single, one-piece member. In particular, as mentioned above, the ratchet body 54 is integrally formed with the sprocket support body 26 as a unitary, one-piece member. Thus, the ratchet teeth 56 are integrally formed with the sprocket support body 26 as a unitary, one-piece member. Preferably, the ratchet teeth 56 are disposed outside the splined region 26a in the axial direction. Also, preferably, the plurality of ratchet teeth 56 are disposed at an end portion of the sprocket support body 26 on a hub body side.

Figure 8:
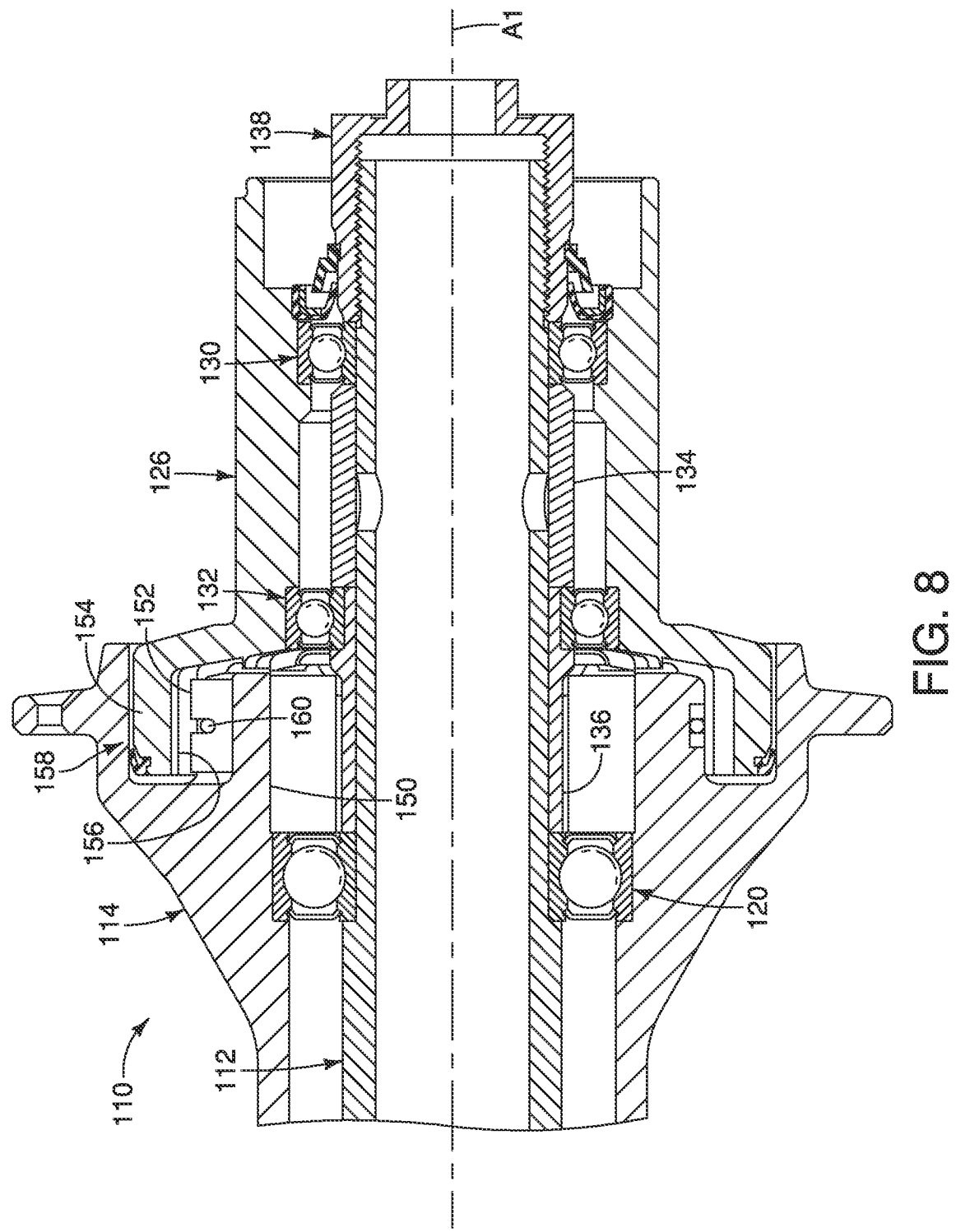
FIG. 8 is an enlarged cross sectional view of a portion of a hub assembly in accordance with a second embodiment.

Referring now to FIG. 8, a hub assembly 110 is illustrated in accordance with a second embodiment. In view of the similarity between the first and second embodiments, the descriptions of the parts of the second embodiment that are identical to the parts of the first embodiment may be omitted for the sake of brevity.

The hub assembly 110 basically comprises a hub axle 112 and a hub body 114. The hub axle 112 is identical to the hub axle 12 of the first embodiment. The hub body 114 has been slightly modified from the hub body 14 as explained below. The hub assembly 110 further comprises at least one hub body bearing 120 rotatably supporting the hub body 114 on the hub axle 112. Preferably, the hub body 114 is rotatably supported on the hub axle 112 by a pair of hub bearings in the same manner as the first embodiment.

The hub assembly 110 further comprises a sprocket support body 126 rotatably disposed to the hub axle 112 to rotate around the rotational center axis A1. The sprocket support body 126 is identical to the sprocket support body 26 of the first embodiment. The hub assembly 110 further comprises at least one sprocket support bearing that rotatably supports the sprocket support body 126 to the hub axle 112. Here, the sprocket support body 126 is rotatably supported to the hub axle 112 by a first sprocket support bearing 130 and a second sprocket support bearing 132. The first sprocket support bearing 130 is identical to the first sprocket support bearing 30 of the first embodiment. The second sprocket support bearing 132 is identical to the second sprocket support bearing 32 of the first embodiment. A first tubular spacing element 134 is disposed on the hub axle 112 between the first sprocket support bearing 130 and the second sprocket support bearing 132. The first tubular spacing element 134 is identical to the first tubular spacing element 34 of the first embodiment. A second tubular spacing element 136 is disposed on the hub axle 112 between the first tubular spacing element 134 and the first hub body bearing 120. The second tubular spacing element 136 is identical to the second tubular spacing element 36 of the first embodiment.

The hub assembly 110 further comprises an end cap 138 threadedly coupled to one end of the hub axle 112 and contacting the first sprocket support bearing 130 to retain the sprocket support body 126 to the hub axle 112 similar to the first embodiment. Also, a second end cap is mounted to the other end of the hub axle 112 similar to the first embodiment.

The hub assembly 110 further comprises a pawl support body 150, at least one pawl 152, a ratchet body 154 and a plurality of ratchet teeth 156. Basically, similar to the first embodiment, the pawl support body 150, the at least one pawl 152, the ratchet body 154 and the ratchet teeth 156 form a one-way clutch 158 operatively disposed between the hub body 114 and the sprocket support body 126. However, the second embodiment differs from the first embodiment in that the pawl support body 150 is integrally formed with the hub body 114 as a unitary, one-piece member. Similar to the first embodiment, the at least one pawl 152 includes a plurality of pawls movably coupled to the pawl support body 150 in the same manner as the first embodiment. The remaining parts (e.g., a biasing element 160) of the one-way clutch 158 are the same as the first embodiment.

Figure 9:
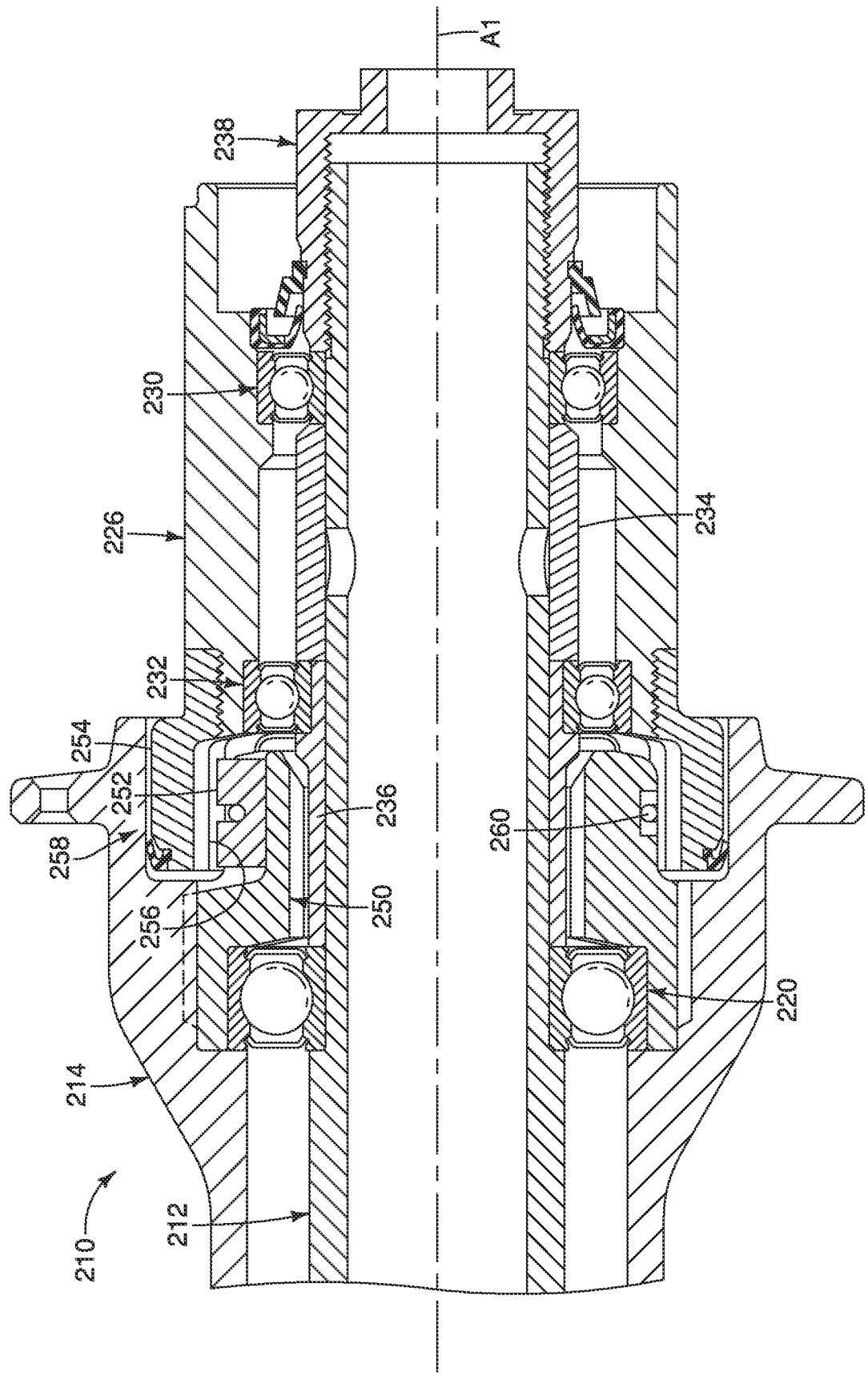
FIG. 9 is an enlarged cross sectional view of a portion of a hub assembly in accordance with a third embodiment.

Referring now to FIG. 9, a hub assembly 210 is illustrated in accordance with a third embodiment. In view of the similarity between the first and third embodiments, the descriptions of the parts of the third embodiment that are identical to the parts of the first embodiment may be omitted for the sake of brevity.

The hub assembly 210 basically comprises a hub axle 212 and a hub body 214. The hub axle 212 is identical to the hub axle 12 of the first embodiment. The hub body 214 is identical to the hub body 14 of the first embodiment. The hub assembly 210 further comprises at least one hub body bearing 220 rotatably supporting the hub body 214 on the hub axle 212. Preferably, the hub body 214 is rotatably supported on the hub axle 212 by a pair of hub bearings in the same manner as the first embodiment.

The hub assembly 210 further comprises a sprocket support body 226 rotatably disposed to the hub axle 212 to rotate around the rotational center axis A1. The sprocket support body 226 has been slightly modified from the sprocket support body 26 of the first embodiment as discussed below. The hub assembly 210 further comprises at least one sprocket support bearing that rotatably supports the sprocket support body 226 to the hub axle 212. Here, the sprocket support body 226 is rotatably supported to the hub axle 212 by a first sprocket support bearing 230 and a second sprocket support bearing 232. The first sprocket support bearing 230 is identical to the first sprocket support bearing 30 of the first embodiment. The second sprocket support bearing 232 is identical to the second sprocket support bearing 32 of the first embodiment. A first tubular spacing element 234 is disposed on the hub axle 212 between the first sprocket support bearing 230 and the second sprocket support bearing 232. The first tubular spacing element 234 is identical to the first tubular spacing element 34 of the first embodiment. A second tubular spacing element 236 is disposed on the hub axle 212 between the first tubular spacing element 234 and the first hub body bearing 220. The second tubular spacing element 236 is identical to the second tubular spacing element 36 of the first embodiment.

The hub assembly 210 further comprises an end cap 238 threadedly coupled to one end of the hub axle 212 and contacting the first sprocket support bearing 230 to retain the sprocket support body 226 to the hub axle 212 similar to the first embodiment. Also, a second end cap is mounted to the other end of the hub axle 112 similar to the first embodiment.

The hub assembly 210 further comprises a pawl support body 250, at least one pawl 252, a ratchet body 254 and a plurality of ratchet teeth 256. Basically, similar to the first embodiment, the pawl support body 250, the at least one pawl 252, the ratchet body 254 and the ratchet teeth 256 form a one-way clutch 258 operatively disposed between the hub body 214 and the sprocket support body 226. However, the third embodiment differs from the first embodiment in that the ratchet body 254 is a separate member from the sprocket support body 226. For example, the ratchet body 254 is threadedly attached to the sprocket support body 226. Similar to the first embodiment, the at least one pawl 252 includes a plurality of pawls movably coupled to the pawl support body 250 in the same manner as the first embodiment. The remaining parts (e.g., a biasing element 260) of the one-way clutch 258 are the same as the first embodiment.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub assembly. Accordingly, these directional terms, as utilized to describe the hub assembly should be interpreted relative to a human-powered vehicle (e.g., bicycle) in an upright riding position on a horizontal surface and that is equipped with the hub assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub assembly for a human-powered vehicle, the hub assembly comprising:
 a hub axle;
 a hub body rotatably mounted on the hub axle to rotate around a rotational center axis of the hub assembly;
 a pawl support body connected to the hub body;
 at least one pawl movably provided to the pawl support body to move between a driving position and a non-driving position;
 a sprocket support body rotatably disposed to the hub axle to rotate around the rotational center axis;
 at least one sprocket support bearing rotatably supporting the sprocket support body on the hub axle;
 a ratchet body connected to the sprocket support body;
 a plurality of ratchet teeth provided to the ratchet body for engaging the at least one pawl to transmit a driving force from the sprocket support body to the hub body while rotating in a driving rotational direction around the rotational center axis, each of the at least one sprocket support bearing is disposed opposite to the hub body with respect to the plurality of ratchet teeth in an axial direction with respect to the rotational center axis; and
 at least one hub bearing rotatably supporting the hub body on the hub axle, each of the at least one hub bearing being disposed opposite the at least one sprocket support bearing with respect to the plurality of ratchet teeth in the axial direction, one of the at least one hub bearing contacting the pawl support body.

2. The hub assembly according to claim 1, wherein the plurality of ratchet teeth is provided on an outer peripheral side of the at least one pawl.

3. The hub assembly according to claim 1, wherein the pawl support body is integrally formed with the hub body as a unitary, one-piece member.

4. The hub assembly according to claim 1, wherein the pawl support body is a separate member from the hub body.

5. The hub assembly according to claim 1, wherein the ratchet body is integrally formed with the sprocket support body as a unitary, one-piece member.

6. The hub assembly according to claim 1, wherein the ratchet body is a separate member from the sprocket support body.

7. The hub assembly according to claim 1, wherein the sprocket support body has a splined region which includes a plurality of splines; and
the plurality of ratchet teeth is disposed outside the splined region in the axial direction.

8. The hub assembly according to claim 1, wherein at least one of the at least one pawl and the plurality of ratchet teeth are overlapped with the hub body as viewed in a radial direction with respect to the rotational center axis.

9. The hub assembly according to claim 1, wherein the plurality of ratchet teeth are disposed at an end portion of the sprocket support body on a hub body side.

10. The hub assembly according to claim 1, wherein the at least one pawl is disposed axially between each of the at least one hub bearing and each of the at least one sprocket support bearing in the axial direction.

11. The hub assembly according to claim 1, wherein the pawl support body is non-rotatably coupled to the hub body and supporting the at least one pawl.

12. The hub assembly according to claim 11, wherein the pawl support body is non-rotatably coupled to the hub body with spline engagement.

13. The hub assembly according to claim 1, wherein the at least one pawl includes a plurality of pawls.

14. The hub assembly according to claim 1, wherein the plurality of ratchet teeth are provided on an inner surface of the ratchet body.

15. The hub assembly according to claim 1, wherein the at least one pawl is located inside the hub body.

16. The hub assembly according to claim 1, wherein the sprocket support body and the plurality of ratchet teeth are a single, one-piece member.

17. The hub assembly according to claim 1, wherein the at least one sprocket support bearing includes a first sprocket support bearing and a second sprocket support bearing that are axially spaced apart along the hub axle.

18. The hub assembly according to claim 17, further comprising
an end cap threadedly coupled to a first end of the hub axle and contacting the first sprocket support bearing to retain the sprocket support body to the hub axle.

19. The hub assembly according to claim 17, wherein the sprocket support body includes a first bearing abutment contacting a first outer race of the first sprocket support bearing and a second bearing abutment contacting a second outer race of the second sprocket support bearing, the first bearing abutment facing in an opposite direction from the second bearing abutment with respect to the rotational center axis.

* * * * *